G. FERGUSON.
APPARATUS FOR PRODUCING SOLES.
APPLICATION FILED AUG. 20, 1919.

1,354,734. Patented Oct. 5, 1920.

INVENTOR
George Ferguson

UNITED STATES PATENT OFFICE.

GEORGE FERGUSON, OF WOLLASTON, MASSACHUSETTS, ASSIGNOR TO UNITED SHOE MACHINERY CORPORATION, OF PATERSON, NEW JERSEY, A CORPORATION OF NEW JERSEY.

APPARATUS FOR PRODUCING SOLES.

1,354,734.   Specification of Letters Patent.   Patented Oct. 5, 1920.

Application filed August 20, 1919. Serial No. 318,728.

*To all whom it may concern:*

Be it known that I, GEORGE FERGUSON, a citizen of the United States, and resident of Wollaston, in the county of Norfolk and State of Massachusetts, have invented certain Improvements in Apparatus for Producing Soles, of which the following description, in connection with the accompanying drawings, is a specification, like reference characters on the drawings indicating like parts in the several figures.

The present invention relates to improvements in apparatus for producing soles for shoes and more especially it consists of apparatus for producing soles of the fabricated type, that is, soles consisting of material which is molded and otherwise prepared to produce a composite sole structure, such, for example, as rubber compound and so-called "fiber" soles. By way of illustration, the invention is herein shown as embodied in an apparatus for producing compound rubber soles for use in the manufacture of turn shoes, although it is not intended to limit the scope of the invention thereby. A sole such as the apparatus illustrated may be adapted to produce is shown in my Patent No. 1,286,176.

The invention has for an object to provide an improved apparatus for producing fabricated soles for shoes with greater accuracy and facility than was possible with the molds heretofore employed. A further object of the invention is to provide an apparatus especially adapted to produce an efficient and serviceable fabricated turn sole including an improved stitch receiving structure for the attachment of a shoe upper to the sole.

With the above and other objects in view, the present invention contemplates an apparatus for producing fabricated soles for shoes comprising, in combination, coöperating mold members constructed and arranged to provide a stock receiving cavity having sole forming surfaces; one of said mold members having means projecting into the sole forming cavity to hold sole stock against shifting on the sole cavity during the operation of the apparatus. In the illustrated embodiment of the invention, the apparatus comprises two coöperating mold members of the "single" cavity type and the provision for holding the sole stock in the stock receiving cavity consists of a plurality of pointed pins projecting from the floor of the cavity mold member. As herein illustrated, the sole which the apparatus is particularly adapted to produce comprises a body portion of rubber or similar compound and a top reinforcing layer of textile material co-extensive with the body portion and having its margin projected upwardly together with the rubber body to constitute a reinforced upper attaching rib for the sole. It is apparent that the top canvas layer of the assembled sole will become impaled upon the pins when molding pressure is first applied to the sole by the two mold members and thereafter during the vulcanization of the sole in which more or less disturbance of the sole stock occurs, the canvas layer is maintained by the pins in a predetermined position in the sole forming cavity. In this way, the completed sole is certain to have its canvas layer extend entirely over the sewing rib and on to the feather portion of the sole, thus providing the maximum reinforcement for the sewing rib. In sole producing apparatus heretofore provided for this purpose it has been a common fault that the molds failed to prevent the canvas or fabric layer from shifting during the molding and vulcanizing of the sole with the result that the canvas was incorporated in only a part of the sewing rib along one portion and in another portion the canvas extended too far over the sewing rib and into the edge of the sole.

The apparatus of the invention, as herein illustrated, is further characterized by a sewing-rib forming groove extending along the margin of the sole forming surface of one of the coöperating molds, this rib forming groove having its inner wall inclined upwardly and outwardly relatively to the outer wall. This construction and arrangement of rib forming groove produces upon the sole a sewing rib which enables the sewing machine operator, in attaching the shoe upper to the sole, to maintain the shoe in the field of operation of the sewing machine with accuracy and facility. The provision of means for holding the canvas in position in the sole receiving cavity during the use of the apparatus is of particular importance with this construction of rib forming groove since considerable more pressure is necessary to form the canvas into the groove and a greater lateral strain and retraction of the canvas occurs.

A still further characterization of the apparatus is the construction and arrangement of the rib forming groove in one of the molded members to provide a substantially vertical outer wall and a flat bottom surface located in the plane of the parallel sole forming surface of the said mold member within the sewing rib. By constructing the sole forming surfaces in this manner greater accuracy and uniformity may be obtained, in the manufacture of the apparatus, particularly in large numbers and the cost of such apparatus is also materially reduced. Moreover, the sole resulting from the apparatus has the top surface of its sewing rib substantially flush with the central portion of the sole, thus making it unnecessary to use a filler or sock lining to level off the top of the foot engaging surface of the sole.

Other objects and features of the invention will appear from the following detailed description, when considered in connection with the accompanying drawings which illustrate a preferred embodiment of the invention, and the invention will then be defined in the appended claims.

Figure 1 of the drawings is a perspective view partially in cross-section illustrating a preferred embodiment of the apparatus of the present invention.

Figure 1:
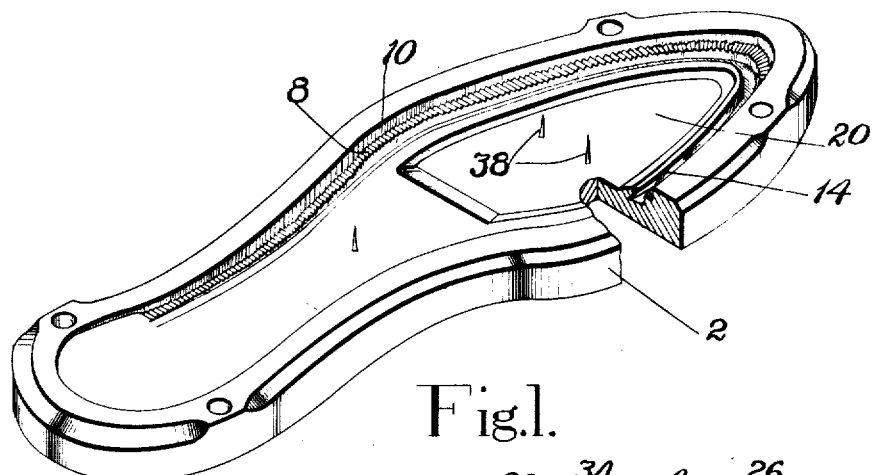

In the drawings, the apparatus of the invention is illustrated as comprising two co-operating mold members of the "single" cavity type, 2 representing the stock receiving or cavity mold member and 4 the pressure plate or cooperating mold member. These plates when alined by means of dowel pins 6 provide a cavity of the area and thickness of a shoe sole and are actuated to produce the sole by a machine which will apply pressure to the two mold members 2, 4 and, also, heat the mold members sufficiently to effect vulcanization of the material constituting the sole. A suitable machine for this purpose is a vulcanizing press between the platens of which the assembled mold members are replaceably mounted and subject to a sufficient pressure and degree of heat to cause the materials constituting the sole to become a vulcanized unitary sole structure.

As herein illustrated, the sole stock receiving cavity which is formed entirely in the lower mold member 2 provides a horizontal marginal surface 8 extending around the edge of the cavity adjacent to its outer wall 10 and of a width corresponding to the extension or feather portion of a sole, this surface 8 being preferably serrated to effect an improvement both in the appearance of the sole extension and in the vulcanized attachment of the canvas material to the sole. Adjacent to the inner edge of this marginal surface 8 is a sewing rib forming groove having a substantially vertical outer wall 14, an inner wall 16 which is inclined upwardly and outwardly toward the wall 14, and a flat bottom surface 18 located through the forepart in the plane of the surface forming the major or central portion of the upper surface of the sole. The rib forming groove extends from substantially the heel breast line on one side of the cavity, around the forepart, to a corresponding point on the opposite side of the cavity and is of a uniform width and depth throughout. Through the shank portion, the surface 18 of the groove is located below the central portion of the cavity. The surface or floor 20 of the sole forming cavity within the groove at the forepart is of a uniform depth corresponding substantially to the depth of the groove so that the sole formed thereby will have its upper surface flush with the top of the sewing rib. In this way, no objectionable rigid projection is produced on the upper surface of the sole, and the necessity of using a "filler" to level off the upper side of the shoe is eliminated. In order to provide the necessary clearance for the sewing machine needle when attaching an upper to the sewing rib on the sole, the marginal portion 22 of the surface 20 is inclined upwardly to the inclined inner wall 16, the angle of inclination being such as to provide the required gutter adjacent to the inner wall of the sewing rib on the completed sole. Preferably, and as herein shown, all of the surfaces of the cavity which are to produce the upper side of the sole, including surfaces 20, 22 and 18 are made substantially flat to facilitate the manufacture of the mold members, particularly in quantities large enough to answer the factory requirements for a number of sizes and styles of shoes. These flat surfaces enable automatic machine operations to be performed in the manufacture of the apparatus to a large extent and also unskilled labor to be employed both of which are of considerable importance in reducing the cost of such apparatus.

The cooperating mold member or pressure plate 4 is made so as to provide a substantially flat surface 26 for forming the lower or tread surface of the sole, the marginal portion of the surface engaging the corresponding flat surface 30 bounding the cavity in the mold member 2.

Figure 2:
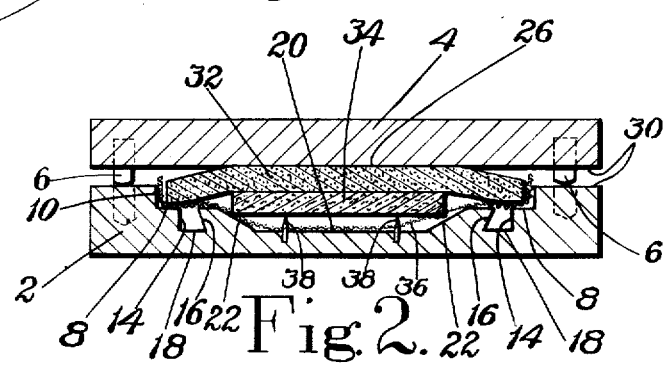
Fig. 2 is a transverse section of the apparatus through its forepart portion and illustrating an assembled composite sole in the stock receiving cavity of the apparatus, prior to the application of pressure to the apparatus.
Figure 3:
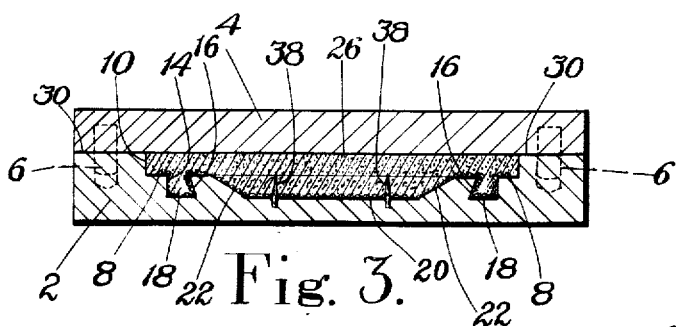
Fig. 3 is a transverse section similar to that shown in Fig. 2 but after molding and vulcanization has occurred.

As herein illustrated, the sole to be produced by the mold members above described comprises three layers of material to wit, a body layer 32 of rubber compound suitable to constitute the tread portion of a turn sole, an intermediate layer 34 of less expensive rubber compound and a top layer 36 of canvas or similar strong fibrous material. As shown in Fig. 2 the top layer of canvas is cut out to a size which, when initially placed in the sole forming cavity of the mold 2, allows a surplus of material along its margin to be formed into the rib forming groove of the mold. This margin of surplus material is forced in to the groove by the action of the body layers 32, 34, when pressure is applied to the mold members. In practice, it is found that the action of the body material of the sole, due to variation in the density of the material and other factors, is not uniform throughout the cavity with the result that the surplus of canvas at the margin is not retracted uniformly into the groove and, at times, the canvas is shifted bodily in the mold. Consequently along one portion of the sole the canvas fails to extend entirely over the sewing rib to reinforce it while at other portions the canvas extends too far over and projects into the edge of the sole where it interferes seriously with the final finishing of the sole edge. Moreover, as the rubber body of the sole under the action of the vulcanizing heat and pressure becomes mobile and the surplus body material is forced out of the cavity, the canvas layer tends to wrinkle and distort.

To eliminate such difficulties and insure an accurate positioning of the canvas on the upper side of the sole, a plurality of pointed pins 38 are provided to impale the canvas layer thereon during the production of the sole. As shown, two of these pins are located at either side of the cavity in the forepart of the mold member 2 and a single pin is located centrally of the shank portion of the cavity. The pins 38 in the forepart portion project from the floor 20 of the cavity and preferably are of a height also to impale the intermediate layer 34 of the sole. By locating the forepart pins one at either side of the cavity and another pin at the shank portion of the cavity, a three-point engagement of the canvas is obtained which effectually prevents both a longitudinal and a transverse shifting of the canvas on the cavity. Also, inasmuch as the central forepart portion of the cavity is located in a lower plane than the marginal surfaces, the two pins serve to offset any excess lateral strain or pulling on the canvas occasioned by the molding pressure being greatest at the margin of the canvas during the initial application of pressure. By reason of the undercut inner wall 16 of the rib forming groove the amount of canvas material to be retracted into the groove is more than otherwise and obviously a greater pressure is required to force the canvas into the groove. Consequently the tendency of the canvas to be retracted unevenly and the strain on the canvas are greater. With the provision of the pins the major portion of the canvas is held securely in predetermined position in the cavity and the amount of canvas to be formed into the groove is taken entirely from the margin of the canvas layer which, assuming that the canvas layer is of the required size insures a uniform incorporation of the canvas into the sewing rib throughout its extent.

In one manner in which the apparatus above described is used, the canvas layer 36 is first positioned in the cavity and forced down on to the impaling pins 38 with its marginal portion bridging the rib forming groove and turning upwardly as shown in Fig. 2. Next, the other layers constituting the sole are placed in the cavity, the intermediate layer being also engaged on the pins to prevent its shifting in the mold cavity. The pressure plate 4 is then placed in position on the member 2 as determined by the dowel pins 6, and the assembled members placed in a vulcanizing press. It will be seen that the application of pressure forces the sole stock into conformation with the sole forming surfaces of the cavity, the pins holding the stock in accurate position and preventing any shifting of the stock by reason of any unevenness in the pressure or variations in the density of the sole stock.

The features of the novel sole herein disclosed are shown, described and claimed in prior applications filed in my name Ser. Nos. 206,688; 266,578; 317,205 and 352,024; and a mold having certain characteristics of the mold shown in the present application is shown, described and claimed in prior application Ser. No. 188,174 filed in my name.

Having described my invention, what I claim as new and desire to secure by Letters Patent of the United States is:—

1. An apparatus for producing fabricated soles for shoes comprising coöperating mold members constructed and arranged to provide a stock receiving cavity having sole forming surfaces, one of said mold members having means projecting above its sole forming surface to impale sole stock thereon during the operation of the mold members.

2. An apparatus for producing fabricated soles for shoes comprising coöperating mold members constructed and arranged to provide a stock receiving cavity having sole forming surfaces, a plurality of pins projecting above its sole forming surfaces to engage sole stock and hold it in position during the operation of the mold members.

3. An apparatus for producing fabricated soles for shoes comprising coöperating mold members constructed and arranged to provide a stock receiving cavity having sole forming surfaces, one of said mold members having means projecting into the stock receiving cavity to hold the sole stock against transverse shifting in the sole cavity during the use of the mold members.

4. An apparatus for producing fabricated soles for shoes comprising coöperating mold members constructed and arranged to provide a stock receiving cavity having sole forming surfaces, one of said mold members having a plurality of pins projecting above its sole forming surface within the central portion of the sole to impale a fabric element of the sole stock thereon and hold it against shifting in the sole cavity during the molding and vulcanization of the sole stock.

5. Apparatus for producing fabricated soles for turn shoes comprising coöperating mold members constructed and arranged to provide a stock receiving cavity having sole forming surfaces including a groove extending along a margin of the sole forming surface of one of the mold members, the said groove having an upwardly and outwardly inclined inner wall, and having means projecting from the sole forming surface of the mold member within the area bounded by said groove to hold sole stock from shifting relatively to the said groove in the stock receiving cavity.

6. Apparatus for producing fabricated soles for turn shoes comprising coöperating mold members constructed and arranged to provide a stock receiving cavity having sole forming surfaces, one of said sole forming surfaces including a groove extending along its marginal portion, said groove having a depth corresponding to the depth of the sole forming surface within the said groove.

7. Apparatus for producing fabricated soles for turn shoes comprising coöperating mold members constructed and arranged to provide a stock receiving cavity having sole forming surfaces, one of said sole forming surfaces including a groove extending along its marginal portion, said groove having a depth corresponding to the depth of the sole forming surface within the said groove, and having a perpendicular outer wall and a converging inner wall.

8. Apparatus for producing fabricated soles for turn shoes comprising coöperating mold members constructed and arranged to provide a stock receiving cavity having sole forming surfaces, one of said sole forming surfaces including a groove extending along its marginal portion, said groove having a substantially perpendicular outer wall and a flat bottom surface parallel to the surface of the mold within the groove.

In testimony whereof I have signed my name to this specification.

GEORGE FERGUSON